United States Patent
Kress et al.

(10) Patent No.: US 6,902,355 B2
(45) Date of Patent: Jun. 7, 2005

(54) JUNCTION

(75) Inventors: Dieter Kress, Aalen (DE); Friedrich Häberle, Lauchheim (DE)

(73) Assignee: Mapal Fabrick fur Prazisionswerkzeuge Dr. Kress KG (DE)

(*) Notice: Subject to any disclaimer, the term of this patent is extended or adjusted under 35 U.S.C. 154(b) by 92 days.

(21) Appl. No.: 09/969,411

(22) Filed: Oct. 1, 2001

(65) Prior Publication Data

US 2002/0067965 A1 Jun. 6, 2002

(30) Foreign Application Priority Data

Oct. 2, 2000 (DE) .......................................... 100 48 910

(51) Int. Cl.$^7$ .............................................. B23B 31/02
(52) U.S. Cl. ............................ 408/59; 279/8; 408/233; 408/239 R; 409/234
(58) Field of Search .............................. 279/8; 408/144, 408/233, 238, 59, 239 A, 239 R, 713; 409/232, 234

(56) References Cited

U.S. PATENT DOCUMENTS

| | | | | | |
|---|---|---|---|---|---|
| 1,746,716 A | * | 2/1930 | Sasse | ........................... | 408/59 |
| 2,383,688 A | * | 8/1945 | Seiter | ............................. | 279/8 |
| 3,041,898 A | * | 7/1962 | Better | .......................... | 408/238 |
| 3,139,800 A | * | 7/1964 | Clarkson et al. | ............... | 407/48 |
| 3,320,833 A | * | 5/1967 | Andreasson | .................. | 408/57 |
| 4,099,889 A | * | 7/1978 | Vig | ........................ | 408/239 R |
| 4,557,642 A | * | 12/1985 | Dudas et al. | ........... | 408/239 R |
| 4,621,960 A | | 11/1986 | Tollner | | |
| 4,748,879 A | | 6/1988 | von Haas | | |
| 4,945,793 A | | 8/1990 | von Haas | | |
| 5,026,224 A | * | 6/1991 | Andersson et al. | ......... | 409/234 |
| 5,163,790 A | * | 11/1992 | Vig | .............................. | 408/57 |
| 5,244,322 A | | 9/1993 | Schweizer et al. | | |

FOREIGN PATENT DOCUMENTS

| | | | | |
|---|---|---|---|---|
| DE | 24 54 146 A | 5/1976 | | |
| DE | 31 36 147 A | 3/1983 | | |
| DE | 33 14 591 C2 | 10/1984 | | |
| DE | 35 32 891 A | 3/1987 | | |
| DE | 41 23 966 C2 | 1/1993 | | |
| DE | 42 11 034 A1 | 10/1993 | | |
| EP | 0015248 A1 | * 9/1980 | .................. | 408/57 |
| EP | 0285704 A2 | * 10/1988 | ..................... | 279/8 |

OTHER PUBLICATIONS

Introduction to Mechanics of Solids, Egor P. Popov, Prentice–Hall, Inc., published 1968, pp. 93–102 and 110–112.*

* cited by examiner

Primary Examiner—Daniel W. Howell
(74) Attorney, Agent, or Firm—Ostrolenk, Faber, Gerb & Soffen, LLP

(57) ABSTRACT

A junction is proposed between two tool parts, where a first tool part has a recess in hollow cone shape, and a second tool part has a cone-shaped projection that can be inserted into the recess. The junction is characterized by the fact that the recess (7) and the projection (33) have practically the identical angel of taper, that the projection (33) is structured to be practically non-resilient, and the wall (9) that surrounds the recess (7) of the first tool part (holder (1)), is structured to be resilient, and that the two tool parts (1, 31) are provided with flat surfaces (23, 37) that rest against one another when the two tool parts (1, 31) are connected. It is essential that the two tool parts are secured together in the assembled state of the junction (1), in an axial direction by means of a clamping device in such a way that the wall (9) of the first tool part (1) is expanded.

15 Claims, 3 Drawing Sheets

JUNCTION

Figure 1:
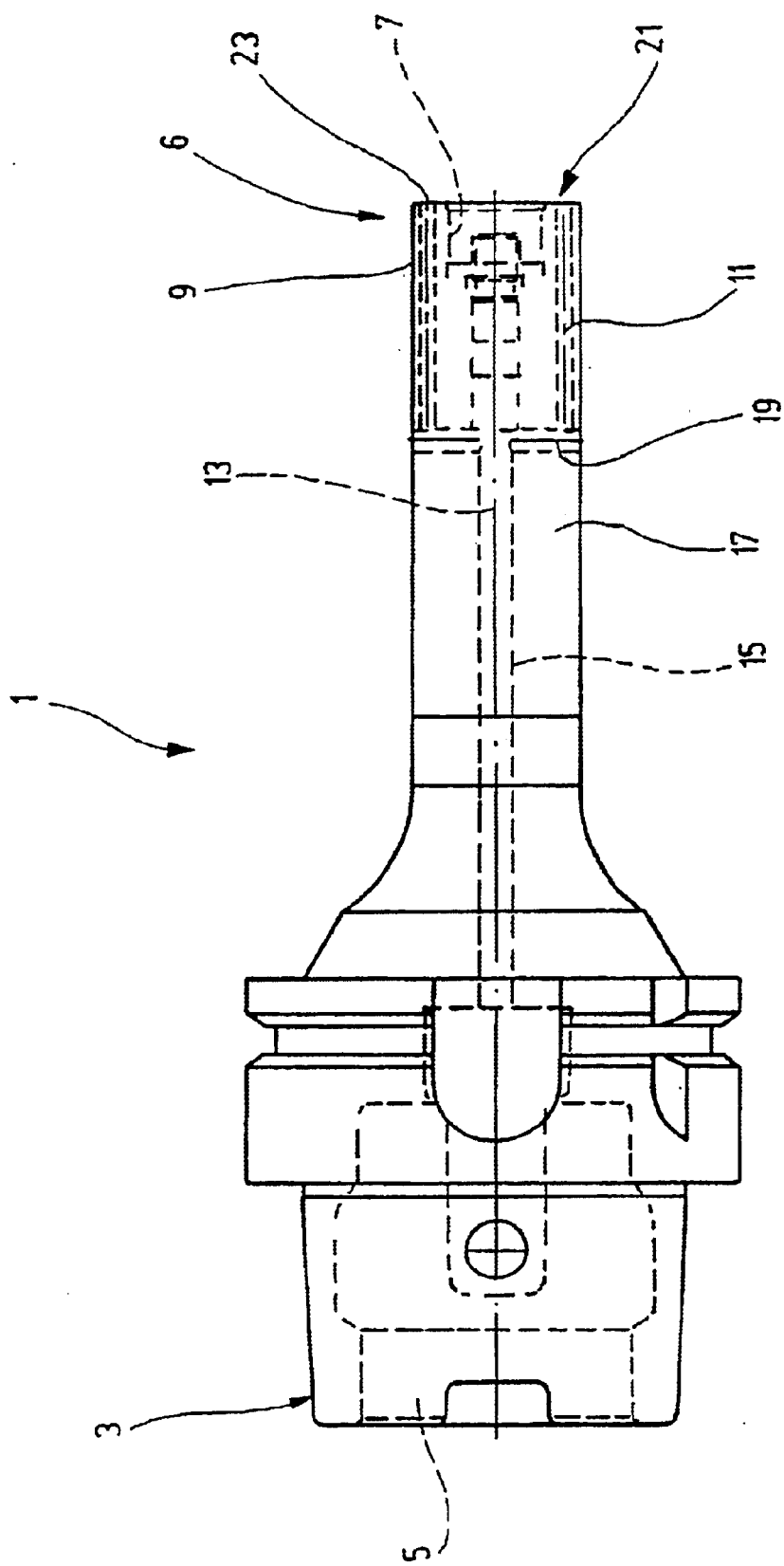

The invention relates to a junction between two tool parts, pursuant to the preamble of claim 1.

Junctions of the type being discussed here are known. They serve to connect two tool parts with one another, for example a tool head with a holder that can be a direct part of a machine tool or in turn can be inserted into a machine tool and attached there. It has been proven that in many cases, the positioning of the two tool parts relative to one another is no longer precise after the junction is released and reassembled, so that the degree of repetition accuracy that can be achieved is no longer sufficient.

It is therefore the task of the invention to create a junction of the type stated initially, which avoids this disadvantage.

To accomplish this task, a junction is proposed that demonstrates the characteristics named in claim 1. It is characterized in that a first tool part with a recess and a second tool part with a projection are provided. In this connection, it is provided that the angle of taper of the recess, which is shaped like a hollow cone, and that of the conical projection are almost precisely the same, so that very precise positioning of the two tool parts relative to one another is possible. In addition, it is provided that the projection is structured to be practically non-resilient, and the wall of the first tool part that surrounds the recess is structured to be resilient. The two tool parts are provided with flat surfaces that rest against one another when the parts are connected. As long as the two tool parts have not yet been secured in place, the flat surfaces are at a distance from one another even when the projection has been inserted into the recess. Only once the clamping device has been activated are the two tool parts secured together in such a way that the flat surfaces rest against one another. The wall of the first tool part is expanded as a result of the axial displacement of the two tool parts while they are being secured, so that on the one hand, the outer surface of the projection rests against the inside surface of the recess, and, on the other hand, the two flat surfaces rest against one another. This results in mechanical redundancy. The projection of the second tool part can be structured to be relatively small, so that over all, a very compact junction can be produced.

Figure 2:
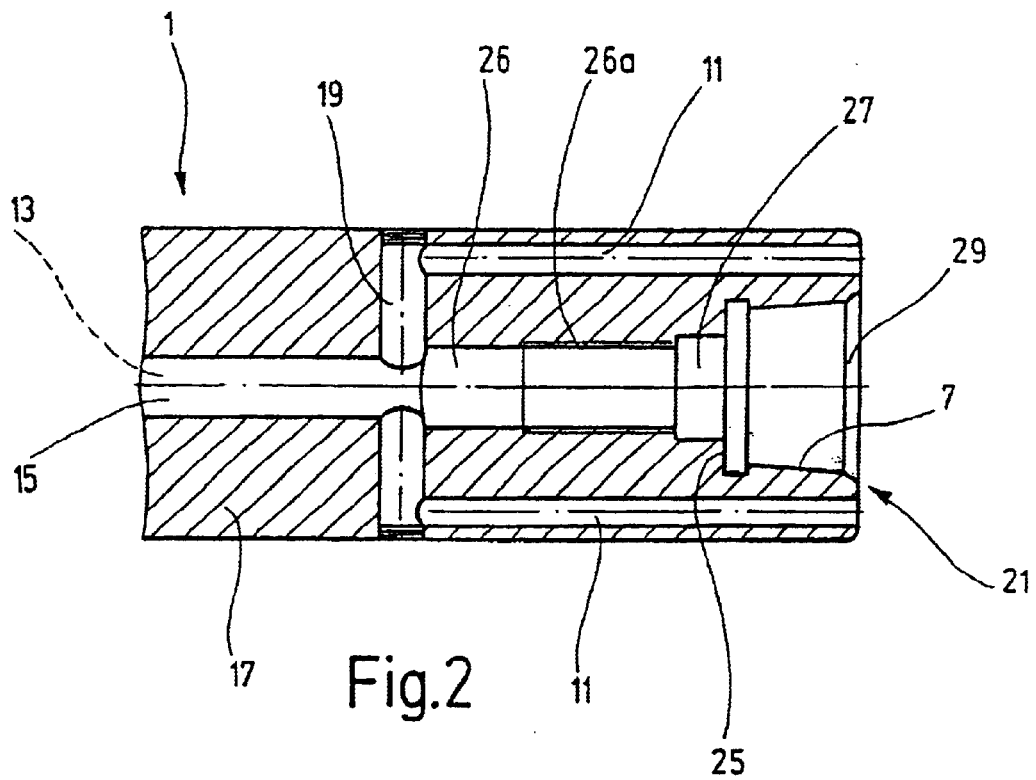

Further developments are evident from the dependent claims. The invention will be explained in greater detail below, on the basis of the drawing, which shows:

FIG. 1 a first tool part of a junction;

FIG. 2 the front end of the first tool part in lengthwise cross-section

Figure 3:
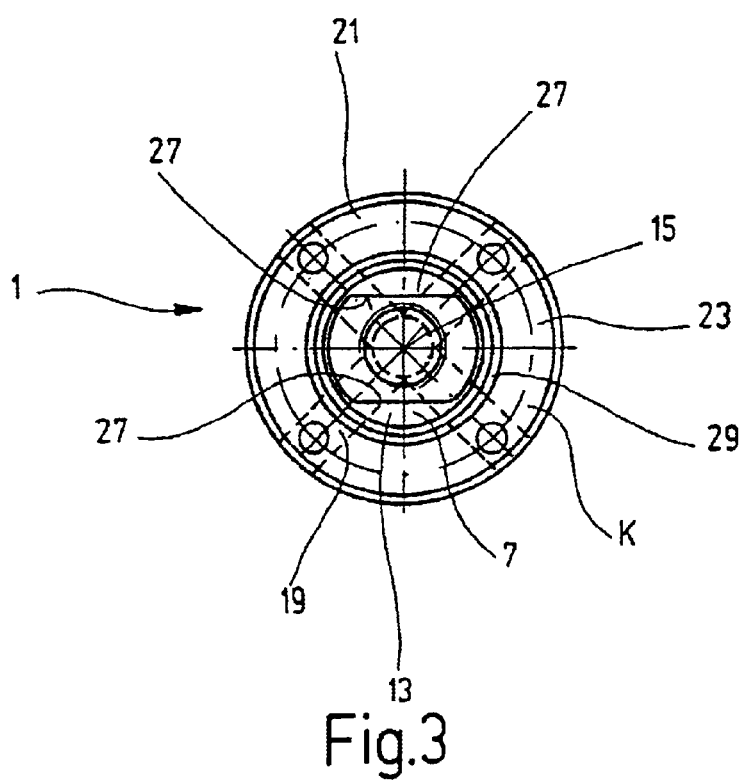
Figure 4:
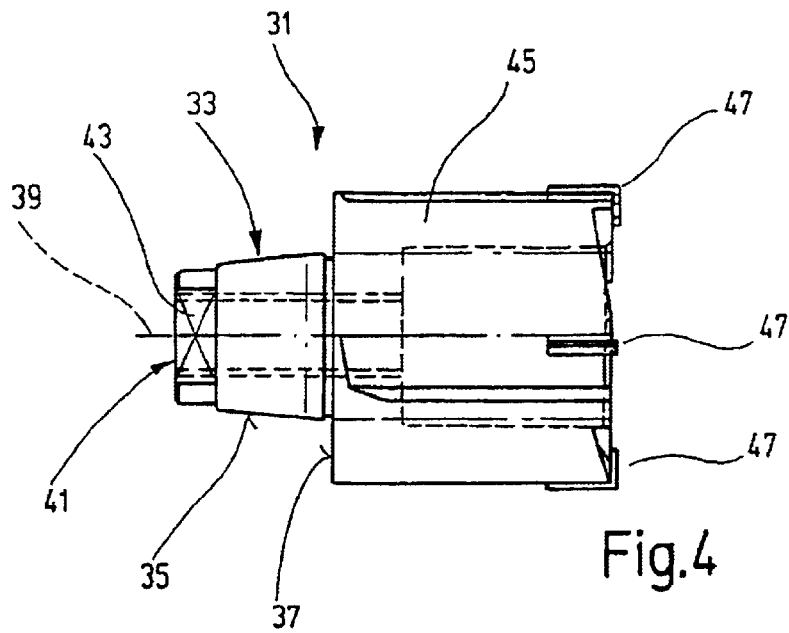
Figure 5:
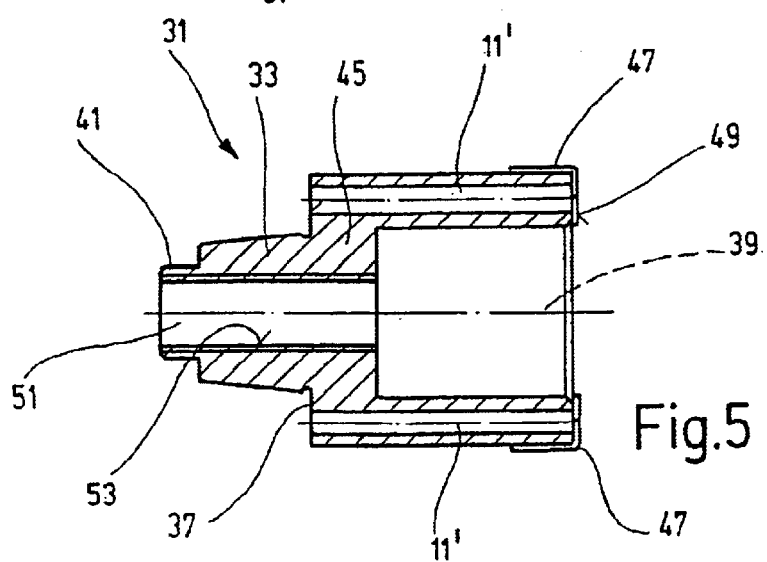

FIG. 3 a top view of the front end of the first tool part;

FIG. 4 a side view of the second tool part;

FIG. 5 a lengthwise cross-section through the second tool part, and

Figure 6:
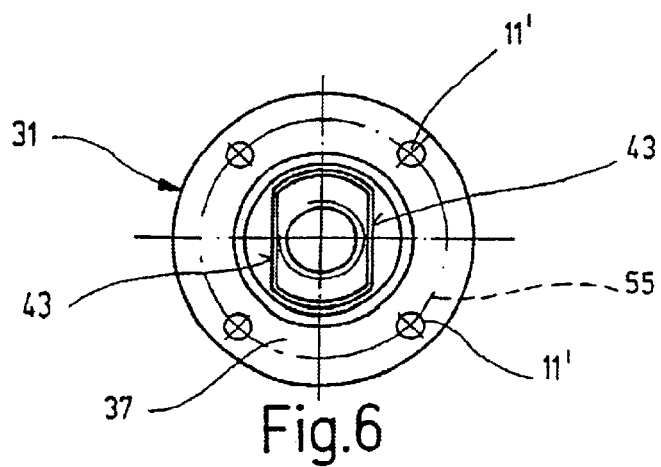

FIG. 6 a rear view of the second tool part.

The first tool part shown in FIG. 1 is holder 1, which is structured with a traditional conical chuck 3 at its one end, on the left in FIG. 1. It has a cavity 5 into which a clamping device, not shown here, engages, in order to open up the conical chuck 3 and firmly secure it in a tool holder.

At its opposite front end 6, on the right in FIG. 1, the holder 1 is provided with recess 7, which is only indicated here, into which the second tool part, now shown here, can be inserted in order to make the junction complete.

At least one coolant and/or lubricant channel 11 is provided in the wall 9 of the holder 1 that surrounds the recess 7. The holder 1 shown here is provided with four such coolant and/or lubricant channels, which are arranged equidistant from one another and run parallel to the center axis 13 of the holder 1. Concentric to this axis, a feed channel 15 runs through the base element 17 of the holder 1, the feed channel 15 opens into a cavity 5. The feed channel 15 is connected with the coolant and/or lubricant channels 11 by way of distributor channels 19, which can run radial to the center axis 13, so that coolant and/or lubricant can be brought to the second tool part via the feed channel 15, the distributor channels 19, and through the coolant and/or lubricant channels 11.

At the face 21 that lies opposite the conical chuck 3, a first flat surface 23 is provided, which surrounds the opening of the recess 7 in the face 21, and is preferably structured in ring shape.

FIG. 2 shows the front end 6 of the holder 1 that lies opposite the conical chuck 3 in an enlarged cross-sectional view. The same parts are identified with the same reference numbers, therefore they will not be described in detail here and reference is made to the description of FIG. 1.

From the enlargement, the recess 7 is clearly evident; it creates an opening in the face 21 of holder 1 and is structured in hollow conical shape. It becomes narrower towards the left, starting from the face 21. In the base surface 25 of the recess 7, at least one drive surface 27 is provided, which is preferably produced using a so-called erosion process. In the exemplary embodiment of the holder 1 shown here, two drive surfaces that lie opposite one another are provided, arranged parallel to one another, at a distance from the center axis 13.

A recess 26, preferably implemented as a bore, opens into the base surface 25 of the recess 7; it runs concentric to the center axis 13 and is provided with an inside thread 26a.

From the enlargement, it is once again clearly evident that the feed channel 15 is connected, via the distributor channel 19, with the coolant and/or lubricant channels 11, which pass through the face 21 of holder 1, and here open into the first flat surface 23, via the distributor channels 19.

FIG. 2 also shows that the recess 7 is provided with a bevel 29 that serves to facilitate insertion of a projection of the second tool part.

From the top view show in FIG. 3, of the face 21 of the holder 1, it is evident that four coolant and/or lubricant channels 11 open into the first flat surface 23, they are arranged equidistant from one another in an imaginary circular line k, and are connected with the central feed channel 15 via four distributor channels 19.

The top view also shows the two opposite drive surfaces 27, which are arranged at a distance from and parallel to one another and to the center axis 13.

In the explanations for FIGS. 1 to 3, it was assumed that the holder 1 can in turn be attached to a machine tool, specifically via the conical chuck 3. However, it is also possible that the holder 1 is itself part of a machine tool, so that the conical chuck 3 is not necessary.

From the representation according to FIG. 1, it becomes clear that the external diameter of the conical chuck 3 is significantly greater than the internal diameter of the recess 7 in the holder 1. The junction between the first tool part, the holder 1, and the second tool part, not shown here, is therefore significantly smaller than the usual attachment for the holder 1 on a machine tool, as implemented by the conical chuck 3.

FIG. 4 shows the second tool part, which can be inserted into the first tool part, the holder 1, to make the junction complete. In the exemplary embodiment shown in FIG. 4, the second tool part is a tool head 31. However, it is also possible that the second tool part is structured as an intermediate piece, an extension element or an adapter, or the like. The important thing is that the second tool part, in other words the tool head 31, is provided with a projection 33 that has a cone-shaped outer surface 35 and is designed in such a way that it can be inserted in the recess 7.

It is also essential that the recess 7 and the projection 33 have practically the same angle of taper. The length of the projection 33 is coordinated with the depth of the recess 7 in such a way that a second flat surface 37, which surrounds the projection 33 and runs perpendicular to the center axis 39 of the tool head 31, rests firmly against the first flat surface 23 of the holder 1, when the two tool parts are firmly connected with one another in order to implement the junction.

The projection 33 is provided with a continuation 41 that has at least one contact surface 43. continuation 41 is basically mainly cylindrical in shape. In the exemplary embodiment shown here, two contact surfaces 43 that lie opposite one another and run parallel to one another are provided, resting against the drive surfaces 27 in the assembled state of the junction.

The second tool part shown in FIG. 4 is structured as a cutting tool head 31 with several cutting plates 47 sunk into the basis element 45 of the second tool part, but the special structure of the tool head 31 and the number of cutting plates 47 is not relevant for the implementation of the junction.

FIG. 5 shows the second tool part, in other words the tool head 31 shown in FIG. 4, in lengthwise cross-section. The same parts are provided with the same reference numbers, so that reference is made to the description of FIG. 4.

The cross-sectional view shows that a face 49 lies opposite the second flat surface 37, and that at least one, here four coolant and/or lubricant channels 11' open into the former, running parallel to the center axis 39 of the second tool part and also open into the second flat surface 37.

A recess 51, preferably structured as a bore, is made in the basis element 45 of the second tool part, structured as a tool head 31, and provided with an inside thread 53.

From FIG. 5, it is evident that the recess 51 is accessible through the face 49, because the tool head 31 is structured to be hollow, for example. However, it would be sufficient for accessibility if the recess 51 were to extend continuously to the face 49, and open out there.

From the rear view of the second flat surface 37 of the second tool part, structured as a tool head 31 here, as show in FIG. 6, it is evident that four coolant and/or lubricant channels 11' arranged equidistant from one another are provided, arranged on an imaginary circular line 55. The diameter of the circular line 55 corresponds to the circular line K shown in FIG. 3, on which the center points of the coolant and/or lubricant channels 11 shown there lie. The distance between the coolant and/or lubricant channels 11 and 11' is identical, so that when the junction is assembled, the coolant and/or lubricant channels of the two tool parts 1 and 31 align with one another, and the coolant and/or lubricant can exit at the face 49 of the second tool part structured as a tool head 31. If the second tool part is structured as an intermediate piece or the like, the coolant and/or lubricant channels 11' must be arranged in such a way that they align with additional channels, which are then coupled with the second tool part.

In the first tool part, structured as a holder 1, the drive surfaces 27 and the coolant and/or lubricant channels 11 are arranged in a defined position relative to one another. This also holds true analogously for the contact surfaces 43 and the coolant and/or lubricant channels 11' of the second tool part, structured as a tool head 31. Therefore, when the projection 33 of the tool head 31 is inserted into the recess 7 of the holder 1, the drive surfaces 27 and the contact surfaces 43 rest against one another, so that it is ensured that the coolant and/or lubricant channels 11 in the holder 1 align with the coolant and/or lubricant channels 11' in the tool head 31. In addition, the drive and contact surfaces 27, 43 serve to prevent rotation of the two tool parts relative to one another, and therefore twisting of the junction.

During assembly of the junction, in other words when the two tool parts are joined together, first the projection 33 is inserted into the recess 7. The size of the projection 33 is selected in such a way that after insertion of the projection into the recess there is a slight distance between the flat surfaces 23 and 37, for example on the order of $2/100$ mm.

In order to ensure that the two tool parts 1 and 31 are securely fixed in place in the area of the junction, a clamping device is provided, which includes a clamping screw. This is brought into engagement with the inside thread 26a in the holder 1 and with the inside thread 53 in the tool head 31, and tightened. When the clamping screw is tightened, a relative axial movement of the two tool parts relative to one another takes place, where the projection 33, which is practically non-resilient, expands the recess 7, i.e. the wall 9 that surrounds the recess 7 of the first tool part. The axial displacement of the two tool parts relative to one another has the result that the flat surfaces 23 and 37 rest firmly against one another. At the same time, the outside of the projection 33 also rests firmly against the inner surface of the recess 7, so that there is mechanical redundancy, with the result that the tool parts are secured in extremely stable manner, and thus a junction. In addition, there is a high level of repetition accuracy.

The angle of taper of the recess 7 and that of the projection 33 are practically identical, as stated before. Preferably, an angle of taper is selected that results in self-locking of the tool parts that are inserted into one another. The angle of taper therefore lies in a range of about 5° or less.

Preferably, a clamping screw is used that has two thread regions that are oriented in opposite directions, namely a right-hand thread and a left-hand thread, and is structured as a differential screw. If this clamping screw is turned in a first direction, the two tool parts 1 and 31 are rigidly secured with one another. If the clamping screw is turned in the opposite direction, the claiming effect on the tool parts in the region of the junction is released, and the projection 33 is pushed out of the recess 7. Since the angle of taper of the recess 7 and that of the projection 33 lie in a range of self-locking, there is a significant advantage that results from the fact that the clamping screw has two opposite thread regions, so that when the clamping screw is turned in the release direction, the two tool parts are pressed apart, overcoming the self-locking effect.

The clamping screw can be accessible through an opening in the face 49 of the second tool part and/or through the cavity 5 and the feed channel 15 in the first tool part.

When the clamping screw, which is not shown in FIGS. 1 to 6, is tightened, the first flat surface 23 in the first tool part and the second flat surface 37 in the second tool part are firmly pressed against one another so that a secure connection between the tool parts occurs in the region of the junction. The first flat surface 23 on the holder 1 can be precisely positioned, as can the second flat surface 37 on the tool head 31. In particular, it is possible to align the second flat surface 37 relative to the projection 33 with great precision. This results in a very precise connection between the tool parts in the region of the junction, and a very high level of repetition accuracy when the two tool parts are released and re-assembled in the region of the junction.

In spite of its small dimensions, the projection 33 is structured to be very stable and practically cannot be deformed, at least not in the radial direction. In comparison, the wall 9 of the holder 1, which surrounds the recess 7, is slightly resilient, so that the projection 33 is firmly secured in the recess 7 when the screw is tightened. The largest external diameter of the projection 33 here is about 1 to 6 μm, preferably 1.5 to 4 μm, particularly 2 to 3 μm larger than the largest internal diameter of the recess 7.

It can be easily seen that the projection 33 of the second tool part, structured as a tool head 31 here, can be relatively small, and that nevertheless, a very stable connection between the tool parts can be achieved, where the precise alignment of the parts relative to one another, as has been discussed, can be guaranteed. The precise alignment of the tool parts relative to one another can be achieved, in particular by structuring the two flat surfaces 23 and 37 as circumferential and preferably as ring surfaces, so that precise contact and alignment of the parts occurs all around the region of the junction.

From the explanations relating to the junction shown in FIGS. 1 to 6, it becomes clear that within a tool system, several junctions of the type described here can be implemented one behind the other, precise positioning of the tool parts relative to one another can be implemented. Furthermore, in spite of the small size, great forces can be transmitted via the junction, or via several junctions. Finally, it should also be pointed out that the advantages of the junction are obtained even if the first tool part is provided with the projection and the second part with the recess, in other words, if the junction is structured essentially as a mirror image.

What is claimed is:

1. A junction assembly for two tool parts comprising:
   a first tool part including a cone-shaped recess and a first substantially flat annular bearing surface surrounding the outer margin of the recess;
   a second tool part including a cone-shaped projection which is sized and configured for insertion into the recess, and a second substantially flat annular bearing surface surrounding the base of the projection; and
   a clamping device operable to apply an axial force to secure the two tool parts together wherein:
   the recess and the projection have substantially identical angles of taper;
   the projection is structured to be substantially non-resilient; and
   a wall defining the recess in the first tool part is structured to deform resiliently when the clamping force is applied so that tapered surfaces of the projection and the recess, and the bearing surfaces on the first and second tool parts respectively rest against one another with substantially no clearance in an accurately repeatable orientation when the two tool parts are connected; and
   the clamping device, when the axial force is released, applies a positive force to separate the first and second tool parts.

2. The junction assembly according to claim 1, wherein the recess and the projection engage in a locking fit when the two tool parts are assembled.

3. The junction assembly according to claim 1, wherein the clamping device is comprised of at least one clamping screw which passes through the two tool parts, and which has a right-hand threaded portion engaged with a threaded bore in one of the tool parts, and a left-hand threaded portion engaged with a threaded bore in the other tool parts.

4. The junction assembly according to claim 1, further including:
   a substantially flat drive surface extending axially from the inner end of the recess; and
   a substantially flat contact surface extending axially from the forward end of the projection,
   the drive surface and the contact surface being sized and configured to engage each other with substantially no clearance when the tool parts are assembled.

5. The junction according to claim 4, wherein:
   the first bearing surface extends radially relative to an axis of elongation of the first tool part; and
   the second bearing surface extends radially relative to an axis of elongation of the second tool part.

6. The junction assembly according to claim 1, wherein the angle of taper of the recess and the projection is about 5° or less.

7. The junction assembly according to claim 1, wherein the first bearing surface extends radially relative to an axis of elongation of the first tool part;
   the second bearing surface extends radially relative to an axis of elongation of the second tool part.

8. A junction assembly for two parts comprising:
   a first tool part having a cone-shaped recess and a substantially flat first bearing surface;
   a second tool party having a cone-shaped projection sized and configured for insertion into the recess, and a substantially flat second bearing surface; and
   a clamping device operable to apply an axial force to secure the two tool parts together, wherein:
   the recess and the projection have substantially identical angles of taper;
   the projection is structured to be substantially non-resilient;
   a wall defining the recess in the first tool part is structured to be resilient;
   the wall defining the recess expands when the clamping force is applied to connect the two tool parts together so that the first and second bearing surfaces rest against one another with substantially no clearance; and
   the clamping device includes at least one clamping screw, which passes through the two tool parts, and which has a right-hand threaded portion and a left-hand threaded portion.

9. The junction assembly according to claim 8, wherein the angle of taper of the recess and the projection is about 5° or less.

10. The junction assembly according to claim 9, wherein the first and second bearing surfaces are ring-shaped.

11. The junction assembly according to claim 9, further including a coolant and/or lubricant channel that runs through the first and second tool parts when the two parts are assembled.

12. The junction assembly according to claim 11, wherein the coolant and/or lubricant channel intersects the first and second bearing surfaces.

13. The junction assembly according to claim 8, wherein the first and second bearing surfaces are ring-shaped.

14. The junction assembly according to claim 8, further including a coolant and/or lubricant channel that runs through the first and second tool parts when the two parts are assembled.

15. The junction assembly according to claim 14, wherein the coolant and/or lubricant channel intersects the first and second bearing surfaces.

* * * * *